Sept. 7, 1954  M. NOVAK  2,688,239
BEVERAGE POT STAND AND GUARD
Filed July 9, 1953
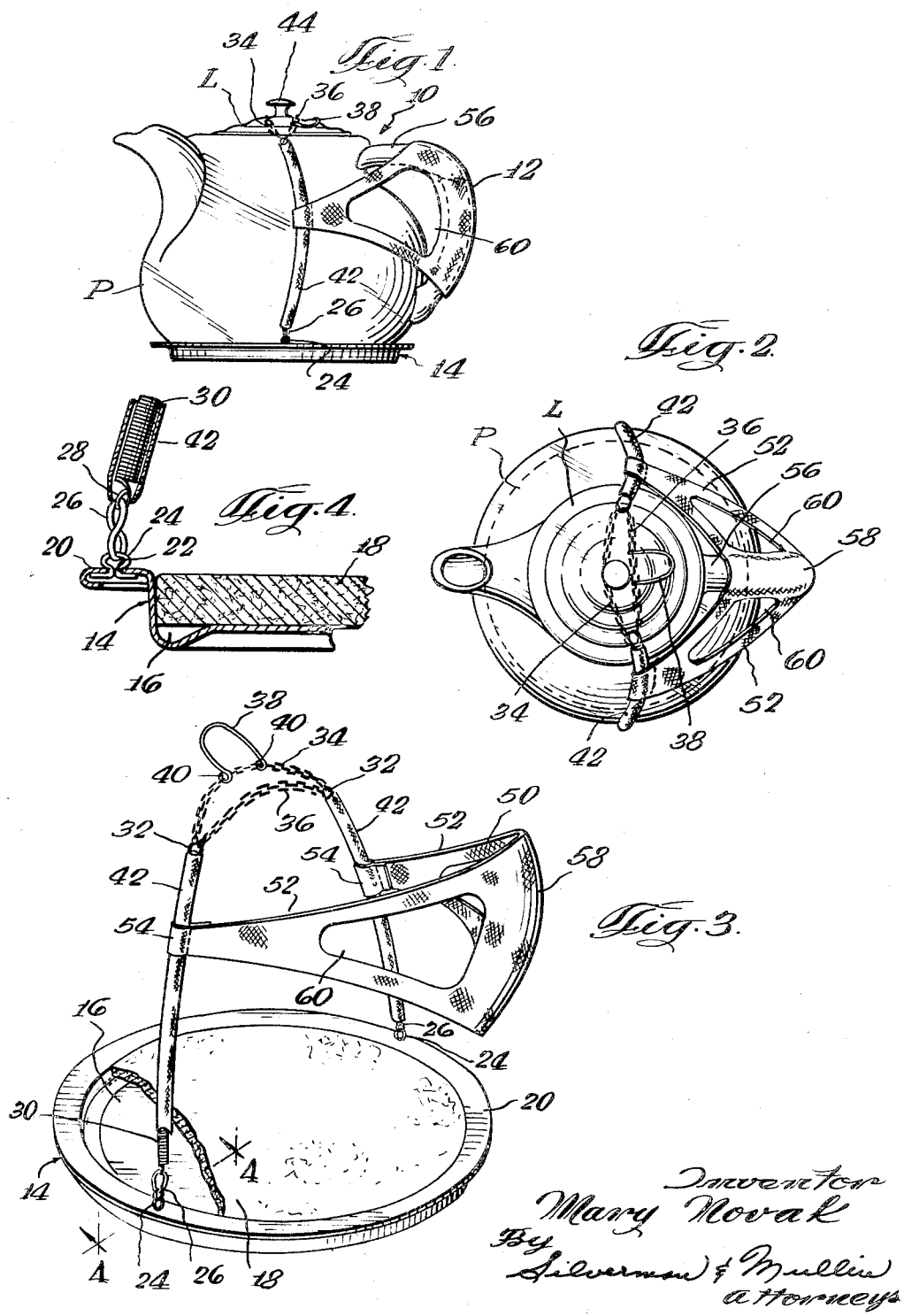
Inventor
Mary Novak
By
Silverman & Mullin
Attorneys Patented Sept. 7, 1954

2,688,239

UNITED STATES PATENT OFFICE 2,688,239

BEVERAGE POT STAND AND GUARD

Mary Novak, Chicago, Ill.

Application July 9, 1953, Serial No. 367,047

2 Claims. (Cl. 65—61)

This invention relates to a device especially useful for beverage containers such as coffeepots and teapots. More particularly the invention relates to an insulated stand or pad for the beverage pot combined with a cover retaining member and an insulated pad for the handle of the pot.

It is well known that beverage pots, especially those for hot liquids, often require insulated stands or pads to prevent injury to table top surfaces or tablecloths and the like. It is also well known that such beverage pots such as porcelain pots which do not have the lids or covers thereof hinged or otherwise connected to the pot are characterized by the undesirable feature of often having the removable lids falling off while the beverage is being poured. Finally, it is also well known that handle pads are usually necessary for holding the handle during the pouring operation since the handle becomes so heated by the hot liquid contents as to often make the same untouchable to the bare hand.

It is therefore an important object of this invention to provide a unitary device providing means for overcoming all of the disadvantages mentioned above and comprising members which afford an insulated stand for the pot, a device for retaining the cover in operational position and a member which affords an insulated pad or holder for the handle.

Another object is to afford a beverage pot device which is adaptable to almost any size or shape beverage pot within certain limits.

A further object is to provide a combination beverage pot stand and guard with a handle pad movable to any required position for the purpose of accommodating pots with handles of various shapes, sizes and positions.

Still another object is to afford a combination beverage pot stand and guard having a removable base absorbent pad which may be changed as needed after saturation of the pad by spilled liquid.

Still a further object is to provide a combination beverage stand pot and guard which may be folded when not in operational position and stored in a compact form requiring little space.

Yet another object is to afford a removable beverage container base which may be retained in operational position in connection with the container.

Yet a further object is to afford a beverage pot stand and guard of simple, inexpensive construction, yet most effective and durable.

With the foregoing and other objects in view which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, I have illustrated in the accompanying drawings a preferred embodiment thereof, from an inspection of which, when considered in connection with the following description, my invention, its mode of construction, assembly and operation, and many of its advantages should be readily understood and appreciated.

Referring to the drawings in which the same characters of reference are employed to indicate corresponding or similar parts throughout the several figures of the dawings:

Fig. 1 is a side elevational view of a teapot with the subject invention in operational position thereon;

Fig. 2 is a top plan view of the same teapot with the combined beverage pot stand and guard illustrated in operational position thereon;

Fig. 3 is a perspective view of the beverage pot stand and guard shown alone without the teapot; and Fig. 4 is a fragmentary sectional view taken on the plane of line 4—4 in Fig. 3 of the drawings and viewed in the direction indicated.

Referring now to the drawings, it will be noted in Fig. 1 that reference numeral 10 indicates generally a teapot P having the combined beverage pot stand and guard indicated by reference numeral 12 positioned operationally on the teapot. The device 12 comprises a bottom dish or plate shaped stand 14 which may be made of metal or any other appropriate material. The plate 14 defines a central area 16 in which may be positioned a pad of absorbent and heat insulating material 18 of a size sufficient to occupy most of the central area 16.

The plate 14 is further formed with an outwardly protruding flange 20 having a pair of openings such as 22 formed therein at diametrically opposed positions. These openings 22 are adapted to accommodate therein eyelet members such as 24 to which in turn may be attached connecting members such as 26 having connected to the opposite ends thereof the end 28 of a coiled spring such as 30.

At the upper ends the springs may be connected to rings such as 32 to which may in turn be connected a pair of short lengths of chain such as 34 and 36. A bent wire member such as 38 is provided with hooks such as 40 which may be connected to one of the chains such as 34 thereby affording means for hanging the device on a hook when not in use.

The coiled springs 30 may be encased in sheaths such as 42 of elastic or pliable material such as textile, rubber, plastic or the like, of sufficient lengths to accommodate the full length of the coiled spring 30 when the same are stretched to the full length if need be. When the coiled springs 30 are in unstretched condition, then the sheaths 42 are either contracted if they are made of elastic material or accordion pleated if they are made of fabric or non-elastic material.

Up to this point it will be perceived that the device as described affords a stand 14 having a removable and replaceable absorbent and insulating pad 18 upon which may be placed a beverage pot P. The stand and pad insulate the pot sufficiently to prevent the heat of the pot from marring or injuring the table top surface or table cloth, while at the same time preventing the scratching or marring of the surface of the pot itself. Moreover, the pad 18 being absorbent absorbs any drops of spilled liquid.

The stand 14 affords a base to which is attached a member for retaining the lid L on the teapot at all times without necessitating the use of the hand for manually retaining the lid thereon. As shown in Figures 1 and 2, this means comprises the pair of chains 34 and 36 between which the lid knob 44 may be positioned with the chains 34 and 36 bearing directly against the top surface of the lid L.

The chains 34 and 36 are in turn operationally connected to the base 14 by means of the encased springs 30 connected to the base 14 by means of the connecting member 26 and eyelet 24. This connecting structure also serves to maintain the base 14 in operational position against the base of the pot P.

As was stated in the objects, a handle holder or pad must likewise be provided for use with a pot containing a hot beverage. Such a pad is provided in combination with the other elements of the stand and guard and comprises a handle sling 50 formed from a piece of heat-insulating material which may be fabric or similar material. The sling is provided with a pair of side members such as 52 having loops such as 54 formed at their extremities and which are adapted to encompass the encased springs 30. These loops 54 are dimensioned so that they exceed the diameter of the encased springs 30 sufficiently to permit the spring to be freely moved longitudinally in respect thereof to any position dictated by the position of the pot handle 56.

Integrally formed with the side members 52 is a central pad 58 which merely comprises a piece of material of the sling itself. This pad 58 is adapted to encompass at least the more remote surfaces of the handle 56. To permit engagement of the covered handle by the hands of the operator, a pair of openings such as 60 may be formed one on each side of the pad 58 so that the fingers and thumb of the hand of the user may be inserted therethrough and the handle 56 grasped thereby.

It will be noted that a construction such as described hereinabove permits the handle sling 50 to accommodate itself to almost any type of teapot handle 56 since it may be moved up and down on the encased spring 30 and also since the spring 30 may be stretched transversely in those cases where the handle 56 protrudes more than the distance defined by half of the length of the handle sling. Moreover, this maintains the handle sling in more intimate operational position on the handle 56 at all times by virtue of the spring tension.

From the foregoing description it should be evident that I have provided a unique beverage pot accessory serving a number of useful functions including the provision of a stand which is maintained at all times in operational position on the pot itself; an absorbent and insulating removable pad contained in the base for insulating the pot from the table surface and also for absorbing drops of spilled liquid; a device for holding the pot lid in position thereby preventing its falling off during the pouring operation when the pot is usually tilted or inverted; and finally an adjustable handle pad or holder associated with the device providing means for grasping the handle without discomfort or heat injury to the hand of the user.

It is believed that my invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of my invention as defined in the appended claims.

What I claim and desire to secure by Letters Patent of the United States is:

1. In a beverage pot device of the character described, a stand, resilient means for mounting said stand on the beverage pot, said resilient means likewise affording means for retaining the lid on said beverage pot, and handle insulating means slideably mounted on said resilient means, said handle insulating means comprising a sling with a centrally positioned insulating pad adapted to fit over the handle of the beverage pot.

2. The device of claim 1 in which said sling is formed with a pair of side members, each of the outer extremities of said side members having a loop formed therein, said loops encircling said resilient means in slideable relationship.

References Cited in the file of this patent

UNITED STATES PATENTS

| Number | Name | Date |
|---|---|---|
| 1,566,933 | Toepfer | Dec. 22, 1925 |
| 2,324,226 | Murphy | July 13, 1943 |

FOREIGN PATENTS

| Number | Country | Date |
|---|---|---|
| 343,765 | Great Britain | Feb. 26, 1931 |
| 425,823 | Great Britain | Mar. 21, 1935 |